US008195421B2

(12) United States Patent
Moir

(10) Patent No.: US 8,195,421 B2
(45) Date of Patent: Jun. 5, 2012

(54) VELOCITY DETECTOR

(75) Inventor: Christopher I. Moir, Malvern Wells (GB)

(73) Assignee: Christopher Ian Moir, Malvern Wells (GB)

( * ) Notice: Subject to any disclaimer, the term of this patent is extended or adjusted under 35 U.S.C. 154(b) by 447 days.

(21) Appl. No.: 12/438,916

(22) PCT Filed: Aug. 24, 2007

(86) PCT No.: PCT/GB2007/003227
§ 371 (c)(1),
(2), (4) Date: Jul. 16, 2009

(87) PCT Pub. No.: WO2008/023185
PCT Pub. Date: Feb. 28, 2008

(65) Prior Publication Data
US 2010/0017166 A1    Jan. 21, 2010

(30) Foreign Application Priority Data

Aug. 25, 2006 (GB) .................................. 0616837.1

(51) Int. Cl.
*G01P 11/00* (2006.01)
(52) U.S. Cl. ......................................................... 702/142
(58) Field of Classification Search .................. 702/142
See application file for complete search history.

(56) References Cited

U.S. PATENT DOCUMENTS

| 5,268,739 | A | 12/1993 | Martinelli et al. |
| 5,608,522 | A | 3/1997 | Breda |
| 5,641,972 | A | 6/1997 | Breda |

FOREIGN PATENT DOCUMENTS
WO    WO 90/05310    5/1990

OTHER PUBLICATIONS

M L Jakobsen, Optical spatial filtering velocimetry sensor for submicron, in-plane vibration measurements, Journal of Optics A: Pure and Applied Optics , May 9, 2005, p. S303-S307.*
International Search Report for International Application No. PCT/GB2007/003227 dated Feb. 28, 2008.
Examination Report in CA 2,661,555 dated Oct. 6, 2010.

(Continued)

*Primary Examiner* — Tung S Lau
(74) *Attorney, Agent, or Firm* — Marshall, Gerstein & Borun LLP

(57) ABSTRACT

Apparatus for determining the velocity and direction of a moving object, the apparatus comprising: a coherent light (L) source arranged to generate an incident beam (B) of coherent light; an optical imaging system arranged to receive light reflected from a moving object passing through the incident beam and to focus the reflected light into a magnified image of the moving image; a first optical mask (M) through which the magnified image is projected, the mask having a first region of alternating opaque and non-opaque areas having a first spacing and second region of alternating opaque and non-opaque areas having a second spacing different from the first spacing; a first light detector (D) arranged to receive the light signal transmitted through the optical mask, the light signal comprising a series of pulses, and to calculate the velocity and direction of the moving object as a function of the pulse frequency and the spacing of the opaque areas of the optical mask.

13 Claims, 2 Drawing Sheets

OTHER PUBLICATIONS

Examination Report in GB 7789314.7 dated Jun. 26, 2009.
Notification of First Office Action in CN 200780031602.1 dated Aug. 4, 2010.
Notification of Second Office Action in CN 200780031602.1 dated Jul. 7, 2011.
Official Action in RU 2009110888 dated Mar. 31, 2011.
DeVore et al., "Effect of Cloud Polarization Properties on Target Discrimination", Aerospace Conference, 2001 IEEE Proceedings, vol. 4, pp. 4/1985-4/1994, Mar. 10, 2001.

* cited by examiner

VELOCITY DETECTOR

FIELD OF THE INVENTION

This invention relates to a velocity detector for measuring the velocity and direction of an object

BACKGROUND TO THE INVENTION

A number of means and methods for detecting the velocity of an object are known in the prior art. One such method projects broad spectrum light reflected from a rough illuminated moving surface onto a mask imprinted with regularly spaced non-transparent lines. The mask is viewed by a detecting means. Each quantum of the returned signal has its own phase relative to an arbitrary reference signal, and the projection lens effectively sums these quanta into a single signal, the overall phase and frequency being related to the velocity of the surface. Whilst this technique delivers a velocity signal, accuracy relies on smoothing the signal, as frequency variations occur which relate to the surface roughness and not just the surface velocity. Also, direction sensing is not possible with this technique.

A further prior art technique known as Laser Doppler Velocimetry ("LDV"), uses the coherent nature of laser light to focus two crossing laser beams with identical polarisation at a single reference point, thereby creating linear and regularly spaced interference fringes within a defined measurement volume. An object passing through the measurement volume will reflect incident light from the fringes back to a detector via a lens system. The signal frequency will relate to the fringe spacing and the velocity of the object. For precision laser beam geometry, fringe spacing is highly regular, allowing accurate velocity measurements to be made. However, it is not possible to determine the direction of transit, as the frequency signal is identical for both left-to-right or right-to-left transitions. Nor is it possible to determine if the object path is exactly orthogonal to the fringes, a condition which produces the highest frequency. For a transit at an angle to the fringes, the frequency will be lower than the theoretical maximum by the cosine of the transit angle.

Complex optoelectronic means, for example Bragg cells, have been employed in LDV systems to modulate the frequency of one of the two laser beams, thereby changing the fringe spacing at the modulation frequency. It is possible to determine L-R or R-L direction by mathematical interpretation of the returned signal. This and similar methods are complex, expensive and not very compact, often requiring high voltages and producing a noisy returned signal, thereby decreasing measurement accuracy.

To measure velocity in X and Y axis, two orthogonal fringe patterns must be created and superimposed in the same measurement volume. In order to distinguish each axis, different laser wavelengths are used for each axis, and the returned signal must be split and filtered at each laser wavelength and then detected. To measure velocity in the Z axis, either an interferometer system must be created, or a second, single plane LDV unit with a different laser wavelength is used, mounted to focus its measurement volume exactly on the two plane volume, but at a defined angle, thereby allowing a Z axis velocity component to be measured. For a small measurement volume, perhaps only 100 µm in diameter, and a long working distance, perhaps over 1 metre, this requires extreme precision.

To produce a single assembly which contains all of the laser beam generation at three different wavelengths with a precision single measurement volume, each having (Bragg) modulation systems in one of the laser beams, together with modulation electronics, high voltage power supplies, three optical receivers at different wavelengths and three detection systems is a difficult and expensive engineering task.

SUMMARY OF THE INVENTION

According to a first aspect of the present invention there is provided a method of determining the velocity and direction of a moving object comprising the steps of generating an incident beam of coherent light, receiving reflected light reflected from a moving object passing through the incident light beam and forming from the reflected light a magnified image of the moving object, projecting the magnified image through a first optical mask having a first region of alternating opaque and non-opaque areas having a first spacing and second region of alternating opaque and non-opaque areas having a second spacing different from the first spacing, detecting the light signal transmitted through the optical mask, the light signal comprising a series of pulses, and calculating the velocity and direction of the moving object as a function of frequency of the signal and the first and second spacing of the opaque areas.

The magnified image may additionally be projected through a second optical mask having a first region of alternating opaque and non-opaque areas having a first spacing and second region of alternating opaque and non-opaque areas having a second spacing different from the first spacing different from the first spacing, the second optical mask being rotated by substantially 90° with respect to the first optical mask, and wherein the light signal transmitted through the second optical mask is additionally detected, whereby the velocity and direction component of the moving object relative to each of the first and second optical masks is calculated.

The magnified image may additionally be input to an interferometer arranged to determine the velocity of the moving object in a direction towards the interferometer. A portion of the incident light beam may additionally be input to the interferometer as a reference signal.

The incident light beam may comprise a pair of beams of coherent light, one beam being polarised with respect to the other beam, the pair of beams being caused to converge at a point through which the moving object passes.

The first and second regions of the or each object mask preferably comprises a pattern of equally spaced lines and the coherent light preferably comprises laser light.

The received reflected light may be passed through a filter having a bandwidth encompassing the frequency of the coherent light.

According to a second aspect of the present invention there is provided apparatus for determining the velocity and direction of a moving object, the apparatus comprising, a coherent light source arranged to generate an incident beam of coherent light, an optical imaging system arranged to receive light reflected from a moving object passing through the incident beam and to focus the reflected light into a magnified image of the moving image, a first optical mask through which the magnified image is projected, the mask having a first region of alternating opaque and non-opaque areas having a first spacing and second region of alternating opaque and non-opaque areas having a second spacing different from the first spacing, a first light detector arranged to receive the light signal transmitted through the optical mask, the light signal comprising a series of pulses, and to calculate the velocity and direction of the moving object as a function of the pulse frequency and the spacing of the opaque areas of the optical mask.

The apparatus may further comprise a beam splitter arranged to split the magnified image into first and second images, the first image being projected through the first optical mask, a second optical mask having a first region of alternating opaque and non-opaque areas having a first spacing and second region of alternating opaque and non-opaque areas having a second spacing different from the first spacing, the second optical mask being rotated by substantially 90° with respect to the first optical mask, and a second light detector arranged to receive the further light signal transmitted through the second optical mask and to calculate the velocity and direction component of the moving object relative to the second optical work.

The apparatus may further comprise an interferometer arranged to receive the magnified image and to determine the velocity of the moving object in a direction towards the interferometer. A portion of the incident light beam may be additionally input to the interferometer as a reference signal.

The coherent light source may be arranged to generate first and second incident light beams, said first and second incident light beams being polarised with respect to one another, and wherein the apparatus further comprises a first lens assembly for converging the first and second incident light beams.

Preferably, the first and second regions of the or each optical mask comprises a pattern of equally spaced lines. Additionally or alternatively, the coherent light source may comprise a laser.

BRIEF DESCRIPTION OF THE DRAWINGS

An embodiment of the present invention will now be described, by way of illustrative example only, with reference to the accompanying drawings, of which.

DESCRIPTION OF THE INVENTION

Figure 1:
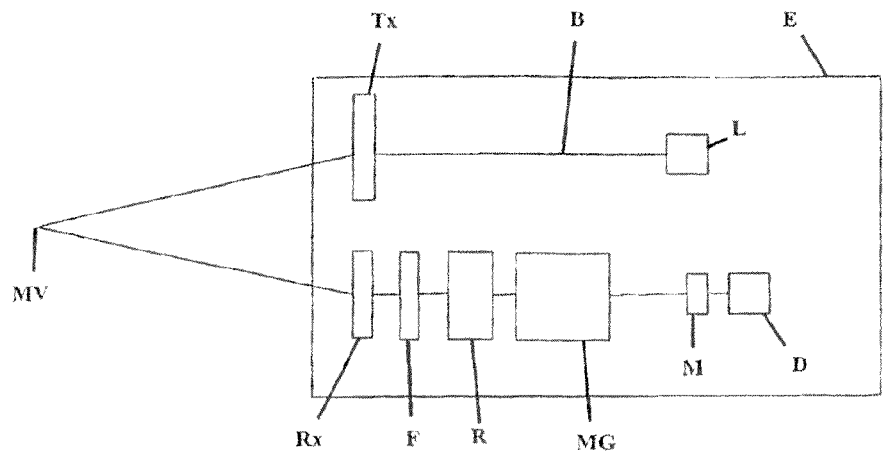
FIG. 1 is a diagrammatic representation of a velocity detector according to a first embodiment of the present invention.

A velocity detector according to a first embodiment of the present invention is schematically illustrated in FIG. 1. Housed within an enclosure (E) is a coherent light source (L), which in preferred embodiments is a laser light source, which generates a light beam (B). The generated light beam is passed through a transmit lens assembly (Tx) that focuses the beam to a reference point (MV) outside the enclosure. A first receive lens assembly (Rx) having a common focal point with the transmit lens assembly receives light reflected from the reference point, and thus from any object passing through the reference point, and passes the reflected light through a filter assembly (F) to a further receiver lens assembly (R). The filter assembly passes light only at the wavelength of the coherent light source (L), thus rejecting any unwanted received light at other wavelengths. The further receiver lens assembly focuses the received coherent light into a magnifier assembly (MG) such that a focused and magnified image of the reference point (MV) is generated. The magnified image is projected through a masking element (M), which is viewed by a light detector (D). The mask includes a substantially transparent substrate, such as glass, on which a substantially opaque pattern is formed, for example by etching or printing techniques.

Figure 3:
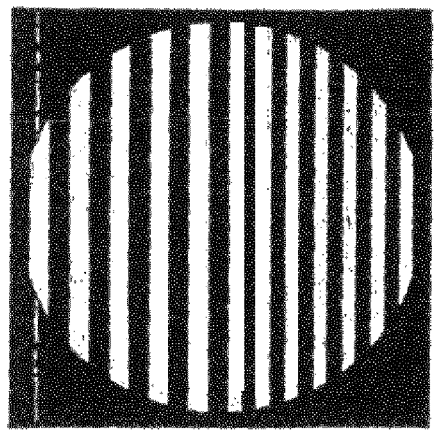
FIG. 3 shows an example of a dual frequency mask for either of the X or Y planes of the velocity detector of FIG. 1.

An example of a mask pattern suitable for use with embodiments of the present invention is illustrated in FIG. 3. One half of the mask has wider spaced lines than the other half, so that an image moving across the mask from left to right produces a lower frequency signal and then a higher one. For an image moving from right to left, the higher frequency signal precedes the lower frequency signal. This dual frequency allows the image direction to be determined. The frequencies produced have a fixed relationship to each other, and produce signals proportional to the image velocity.

The apparatus schematically illustrated in FIG. 1 allows the velocity and direction of an object moving through the reference point (MV) to be determined in a single axis perpendicular to the axis of the apparatus, the orientation of the single axis being dictated by the orientation of the masking element (M). In a further embodiment a dual axis detector can be realised by including an optical beam splitter within the apparatus such that the magnified image exiting the magnifier assembly is split into two light beams, and each beam is directed to a respective masking element and associated detector. Each masking element is preferably to be identical but are mounted rotated at 90° to one another, thus allowing velocity and direction measurement in two mutually perpendicular axis.

As the invention is likely to be used to measure the transit of very small particles, probably with a diameter of 1 μm or less, and these diameters might be close to the laser wavelength, the shape of the particle will sometimes effect the light scattered from it, especially when the light illuminating the particle is plane polarised, such as with laser light. If two laser beams are used, focussed and crossing at a single point, but with one beam having its polarisation changed by 90 degrees, the effect of particle irregularity is greatly reduced, and the different polarisation suppresses the generation of unwanted interference fringes within the measurement volume. The task of locating the measurement volume in free space is also made easier, as the two beams will separate away from the volume, but will be a single circular spot at the measurement volume. An embodiment of the present invention having this arrangement is illustrated in FIG. 2.

Figure 2:
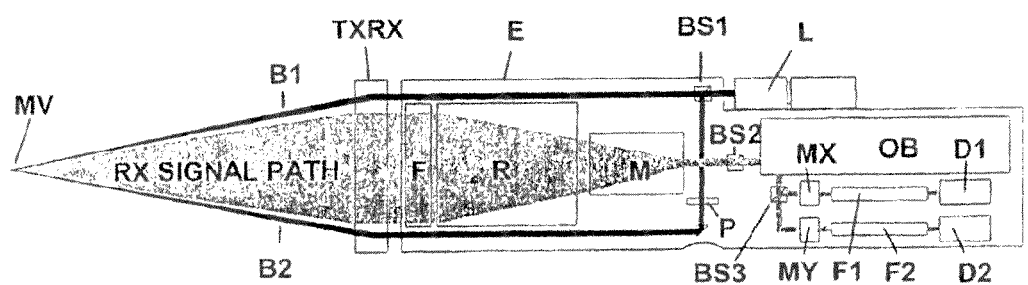
FIG. 2 is a diagrammatic representation of a 3-axis velocity detector according to an embodiment of the present invention.

In an analogous manner to the apparatus shown in FIG. 1, the detector shown in FIG. 2 comprises an enclosure (E) and a laser light source (L). A first beam splitter (BSI) splits the laser beam into two parallel beams (B1, B2) that are focussed and cross at a reference point (MV) on the receiver axis, with the second beam passing through a polarisation element (P) to modify the polarisation by 90 degrees, both beams emerging from a shared transmit-receive lens (TXRX) to ensure a common focal point. Light reflected from an object at reference point (MV) is received by a receiver lens assembly (R) preceded by an interference filter at the laser wavelength (F) to reject unwanted light at other wavelengths. A magnifier assembly (M) receives the light from the receiver lens assembly and outputs a focused and magnified image of the reference point (MV). The image is passed through a second beam-splitter (BS2) to divert some of the received image to a Z axis interferometer assembly (ZI), described in more detail below, and then a third beam-splitter (BS3) to create X and Y axis images, followed by masking elements (MX) and (MY) for the X and Y axis, viewed by detectors (D1) and (D2) either directly or via optional fibre optic light guide assemblies (F1) and (F2) such that the detectors and their associated electronics may be mounted remotely from the velocity detector optical assembly. Furthermore, the laser assembly (L) can also be mounted remotely from the velocity detector optical assembly and connected by a fibre optic link.

Figure 4:
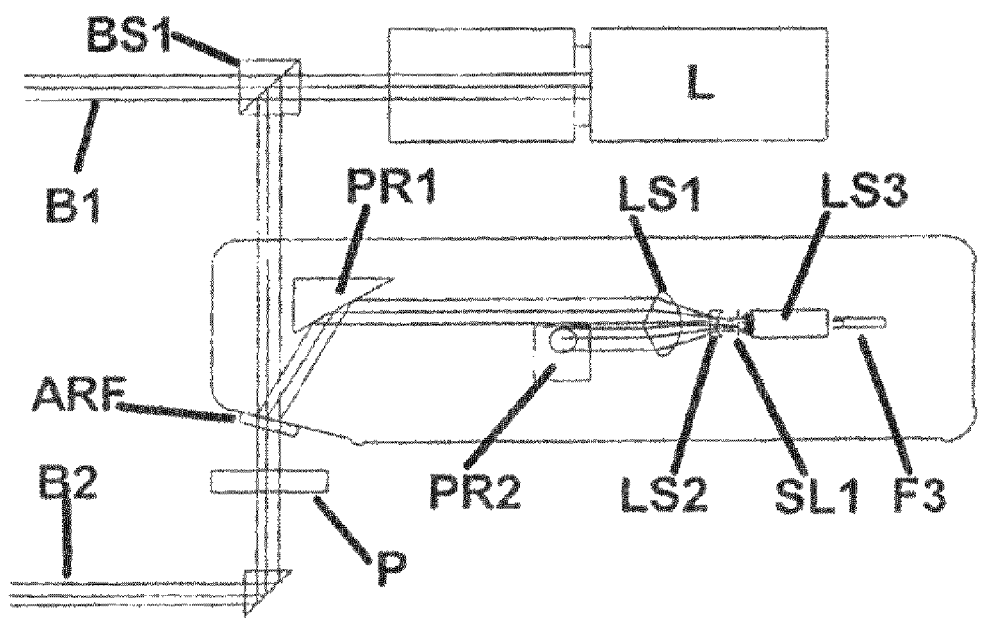
FIG. 4 is a diagrammatic representation of an interferometer assembly used to measure velocity in the Z direction.

The provision of the first and second masking elements (MX, MY) allows the velocity and direction of a moving object to be determined in the perpendicular X and Y axes. To determine corresponding measurements in the Z axis, i.e. along the receiver axis the above mentioned interferometer assembly is included. A suitable interferometer assembly is schematically illustrated in FIG. 4. The interferometer assembly has two input sources of light. The first is taken from the second of the laser beams B2 derived from the laser source (L) via the first beam splitter BS1 using an anti-reflection coated glass flat (ARF) mounted at an angle to the second beam B2. This takes approximately 0.25% of the energy in the second beam B2 and sends it via a first prism PR1 to one half of a first lens LS1. This is the reference signal for the interferometer. The second light source is taken from the second beam splitter BS2 (FIG. 2) and is sent via second prism PR2 to the other half of the first lens LS1. This is the received signal from the measurement volume MV. Both light sources are then directed by the first lens LS1 to a second lens LS2, the combination of which reduces the spacing between the two sources and re-establishes them as parallel light sources. These signals then pass to a dual slit SL1 creating intersecting wavefronts as the energy passing through the slits interferes. The wavefront signals are then directed by a third lens LS3 to an optional dual fibre optic cable assembly F3 and then on to two electronic detectors. The slit spacing for the dual slit SL1 is related to the laser wavelength and creates a unique signal pattern as the phase of the two input signals change relative to each other, caused by the illuminated object moving in a Z direction within the measurement volume MV. This unique pattern can be processed to deliver the object direction and the rate of change of the wavefront as it passes over the slits can be processed to deliver the object velocity.

In the three axis detector illustrated in FIG. 4 it is important that the light signal emerging from the magnifier assembly (M) does not form a coherent image at the second splitter (BS2), in order to present a fully uniform wavefront to the interferometer mechanism. A long folded optical path within optical block (OB) is used to establish the image and present it to masks (MX) and (MY).

It is also important that the entire receiver assembly (TXRX, F, R, M, BS2, OB, BS3) produces a high quality, geometrically undistorted image at the laser wavelength in order to maintain measurement accuracy and that the masks (MX) and (MY) are similarly of high geometric precision. The magnifier assembly (M) is adjusted to present a focussed image of the object at the correct image size and at the imprinted surface of masks (MX) and (MY).

This invention overcomes most of the complexities associated with multiple beam, multiple plane LDV systems, and does so at a greatly reduced cost and at high accuracy. In its most complex form it provides 3 axis velocity measurement in a single enclosure. However, dual (X and Y, (X or Y) and Z) and single plane (X, Y or Z) units can also be created.

The use of a coherent light source allows a precision measurement volume to be created, as the "spatial and temporal coherence" characteristics of such light, and in particular of laser light, ensure a defined focal diameter and measurement volume length. As the imaging system also focuses precisely on the measurement volume, a single light beam could be used even for multiple axis measurements, contrasting very favourably in complexity and cost with the six laser beams detailed in the LDV system in the prior art. The measurement volume would therefore be defined by the interaction of the two optical systems.

In some embodiments of the invention, both light beam paths lie outside of the receiving optic's field of view except at the measurement volume. This is preferable when very small particles are sought, as the detector sensitivity must of necessity be very high. If a light beam were to intersect the receiver field of view, random particles passing through either beam away from the focus might create a noise signal which could be deflected into the detectors, creating spurious signals.

For the X and Y axis, the measurement accuracy of the velocity detector is determined solely by the geometric accuracy of the receiving optics and the linearity of the patterns imprinted onto the masks. Accuracies of 0.1% or better can be achieved with conventional deposition and manufacturing techniques. For the Z axis, accuracy is determined mainly by the laser wavelength stability, which can be very high.

The invention claimed is:

1. A method of determining the velocity and direction at micron or sub micron scale of a moving object comprising the steps of:
   generating an incident beam of coherent light, wherein the incident light beam comprises a pair of beams of coherent light, one beam being polarized with respect to the other beam, the pair of beams being caused to converge at a point through which the moving object passes;
   receiving reflected light reflected from a moving object passing through the incident light beam and forming from the reflected light a magnified image of the moving object;
   projecting the magnified image through a first optical mask having a first region of alternating opaque and non-opaque areas having a first spacing and second region of alternating opaque and non-opaque areas having a second spacing different from the first spacing;
   detecting the light signal transmitted through the optical mask, the light signal comprising a series of pulses, and calculating the velocity and direction of the moving object as a function of frequency of the signal and the first and second spacing of the opaque areas.

2. The method of claim 1, wherein the magnified image is additionally projected through a second optical mask having a first region of alternating opaque and non-opaque areas having a first spacing and second region of alternating opaque and non-opaque areas having a second spacing different from the first spacing different from the first spacing, the second optical mask being rotated by substantially 90° with respect to the first optical mask, and wherein the light signal transmitted through the second optical mask is additionally detected, whereby the velocity and direction component of the moving object relative to each of the first and second optical masks is calculated.

3. The method of claim 1, wherein the magnified image is additionally input to an interferometer arranged to determine the velocity of the moving object in a direction towards the interferometer.

4. The method of claim 1, wherein the first and second regions of the or each object mask comprises a pattern of equally spaced lines.

5. The method of claim 1, wherein the coherent light comprises laser light.

6. The method of claim 1, wherein the received reflected light is passed through a filter having a bandwidth encompassing the frequency of the coherent light.

7. The method of claim 3, wherein a portion of the incident light beam is additionally input to the interferometer as a reference signal.

8. Apparatus for determining the velocity and direction at micron or sub micron scale of a moving object, the apparatus comprising:
- a coherent light source arranged to generate an incident beam of coherent light, wherein the coherent light source is arranged to generate first and second incident light beams, said first and second incident light beams being polarized with respect to one another;
- a first lens assembly for converging the first and second incident light beams;
- an optical imaging system arranged to receive light reflected from a moving object passing through the incident beam and to focus the reflected light into a magnified image of the moving image;
- a first optical mask through which the magnified image is projected, the mask having a first region of alternating opaque and non-opaque areas having a first spacing and second region of alternating opaque and non-opaque areas having a second spacing different from the first spacing;
- a first light detector arranged to receive the light signal transmitted through the optical mask, the light signal comprising a series of pulses, and to calculate the velocity and direction of the moving object as a function of the pulse frequency and the spacing of the opaque areas of the optical mask.

9. The apparatus of claim 8 further comprising:
- a beam splitter arranged to split the magnified image into first and second images, the first image being projected through the first optical mask;
- a second optical mask having a first region of alternating opaque and non-opaque areas having a first spacing and second region of alternating opaque and non-opaque areas having a second spacing different from the first spacing, the second optical mask being rotated by substantially 90° with respect to the first optical mask; and
- a second light detector arranged to receive the further light signal transmitted through the second optical mask and to calculate the velocity and direction component of the moving object relative to the second optical work.

10. The apparatus of claim 8 further comprising an interferometer arranged to receive the magnified image and to determine the velocity of the moving object in a direction towards the interferometer.

11. The apparatus of claim 8, wherein the first and second regions of the or each optical mask comprises a pattern of equally spaced lines.

12. The apparatus of claim 8, wherein the coherent light source comprises a laser.

13. The apparatus of claim 10, wherein a portion of the incident light beam is additionally input to the interferometer as a reference signal.

* * * * *